(12) United States Patent
Chong et al.

(10) Patent No.: US 8,194,623 B2
(45) Date of Patent: Jun. 5, 2012

(54) EVOLVING-TYPE USER RESOURCE STRUCTURE/CHANNELIZATION WITH ENHANCED DIVERSITY FOR OFDMA BASED TIME-VARYING CHANNELS

(75) Inventors: Chia-Chin Chong, Santa Clara, CA (US); Hlaing Minn, Richardson, TX (US); Fujio Watanabe, Union City, CA (US)

(73) Assignee: NTT DoCoMo, Inc., Tokyo (JP)

( * ) Notice: Subject to any disclaimer, the term of this patent is extended or adjusted under 35 U.S.C. 154(b) by 477 days.

(21) Appl. No.: 12/455,268

(22) Filed: May 28, 2009

(65) Prior Publication Data

US 2010/0118826 A1 May 13, 2010

Related U.S. Application Data

(60) Provisional application No. 61/076,540, filed on Jun. 27, 2008.

(51) Int. Cl.
*H04W 74/00* (2009.01)
(52) U.S. Cl. .......................... 370/336; 370/343
(58) Field of Classification Search .................. None
See application file for complete search history.

(56) References Cited

U.S. PATENT DOCUMENTS

| | | | |
|---|---|---|---|
| 5,457,712 A | 10/1995 | Weerackody | |
| 6,104,933 A | 8/2000 | Frodigh et al. | |
| 6,246,881 B1 * | 6/2001 | Parantainen et al. | 455/450 |
| 6,788,751 B1 | 9/2004 | Hustig et al. | |
| 6,853,694 B1 | 2/2005 | Beaudin et al. | |
| 6,904,283 B2 | 6/2005 | Li et al. | |
| 6,917,812 B2 | 7/2005 | Damnjanovic | |
| 6,987,738 B2 | 1/2006 | Subramanian et al. | |
| 2005/0265223 A1 | 12/2005 | Song | |
| 2005/0276344 A1 | 12/2005 | Ling et al. | |
| 2006/0007849 A1 * | 1/2006 | Kim et al. | 370/208 |
| 2006/0109865 A1 | 5/2006 | Park et al. | |
| 2006/0116077 A1 | 6/2006 | Liu et al. | |
| 2006/0120395 A1 | 6/2006 | Xing et al. | |
| 2006/0146920 A1 | 7/2006 | Suh et al. | |
| 2007/0064780 A1 | 3/2007 | Zheng et al. | |
| 2007/0098093 A1 * | 5/2007 | Kwon et al. | 375/260 |
| 2007/0110003 A1 | 5/2007 | Tujkovic et al. | |
| 2007/0206534 A1 * | 9/2007 | Kwun et al. | 370/329 |
| 2008/0002619 A1 | 1/2008 | Tujkovic et al. | |
| 2008/0076438 A1 | 3/2008 | Chang et al. | |
| 2009/0190537 A1 * | 7/2009 | Hwang et al. | 370/329 |

OTHER PUBLICATIONS

PCT International Search Report for International Patent Application No. PCT/US2009/048413 dated Aug. 10, 2009, 2 pages.
PCT Written Opinion of the International Searching Authority for International Patent Application No. PCT/US2009/048413 dated Aug. 10, 2009, 4 pages.

(Continued)

*Primary Examiner* — Robert Scheibel
(74) *Attorney, Agent, or Firm* — Haynes & Boone, LLP.

(57) ABSTRACT

An evolving-type resource structure supports high data rate services at high mobile speeds. The evolving-type resource structure is an efficient diversity-exploiting user resource structure for fast time-varying frequency-selective fading channel environments. In one example, an evolving-type resource structure takes advantages of both band-type and interleaved-type structures which exploit both multiuser diversity and frequency diversity in fast time-varying channels. The evolving-type resource structure is applicable to centralized, semi-distributed and distributed access schemes and may be used in both downlink (DL) and uplink (UL) transmissions in a cellular system.

23 Claims, 10 Drawing Sheets

Example of the proposed evolving-type resource structure of block index sets for four subchannels.

OTHER PUBLICATIONS

R. Knopp and P. A. Humblet, "Information capacity and power control in single-cell multiuser communications," *Proc. IEEE Intl. Conf. Commun.*, Seattle, WA, Jun. 1995, pp. 331-335.

D. N. C. Tse, "Optimal power allocation over parallel Gaussian broadcast channels," in *Proc. Intl. Symp. Inf. Theory*, Ulm, Germany, Jun. 1997, pp. 27-27.

P. Viswanath, D. N. C. Tse, and R. Laroia, "Opportunistic beamforming using dumb antennas," *IEEE Trans. Inform. Theory*, vol. 48, No. 6, Jun. 2002, pp. 1277-1294.

P. Svedman, S. K. Wilson, L. J. Cimini, and B. Ottersten, "Opportunistic beamforming and scheduling for OFDMA systems," *IEEE Trans. Commun.*, vol. 55, No. 5, May 2007, pp. 941-952.

R. Chemaly, K. Letaief, and D. Zeghlache, "Adaptive resource allocation for multiuser MIMO/OFDM networks based on partial channel state information," *Proc. IEEE GLOBECOM 2005*, St. Louis, MO, Nov. 2005, pp. 3922-3926.

J. Oh and J. M. Cioffi, "Sub-band rate and power control for wireless OFDM systems," *Proc. IEEE Vehicular Technology Conference (VTC 2004-Fall)*, Los Angeles, CA, vol. 3, Sep. 26-29, 2004, pp. 2011-2014.

F.-S. Chu and K.-C. Chen, "Fair adaptive radio resource allocation of mobile OFDMA," *Proc. IEEE Personal, Indoor and Mobile Radio Communications (PIMRC 2006)*, Helsinki, Finland, Sep. 2006, pp. 1-5.

X. Qin and R. Berry, "Opportunistic splitting algorithms for wireless networks," *IEEE INFOCOM 2004*, Hong Kong, Mar. 2004, pp. 1662-1672.

X. Qin and R. Berry, "Distributed approaches for exploiting multiuser diversity in wireless networks," *IEEE Trans. Inform. Theory*, vol. 52, No. 2, Feb. 2006, pp. 392-413.

Y. Xue, T. Kaiser, and A. B. Gershman, "Channel-aware ALOHA-based OFDM subcarrier assignment in single-cell wireless communications," *IEEE Trans. Commun.*, vol. 55, No. 5, May 2007, pp. 953-962.

D. Wang, H. Minn, and N. Al-Dhahir, "A distributed opportunistic access scheme for OFDMA systems," *Proc. IEEE GLOBECOM 2006*, San Francisco, CA, Nov. 2006, pp. 1-5.

T. Kunihiro, T. Yamaura, M. Suzuki, E. Fujita, "BDMA testbed-configuration and performance results," *Proc. IEEE Vehicular Technology Conference, VTC Spring*, vol. 3, May 16-20, 1999, pp. 1836-1840.

P. Bisaglia, S. Pupolin, D. Veronesi, M. Gobbi, "Resource allocation and power control in a TDD OFDM-based system for 4G cellular networks," *Proc. IEEE Vehicular Technology Conference, VTC Spring*, vol. 4, May 7-10, 2006, pp. 1595-1599.

Y. Teng, K. Naito, K. Mori, H. Kobayashi, "Performances of multicarrier system with time and frequency domain spreading for wireless communications," *Proc. International Conference on Wireless Networks, Communications and Mobile Computing*, vol. 1, Jun. 13-16, 2005 pp. 558-563.

X. Fu, Y. Li, and H. Minn, "A new ranging method for OFDMA systems," *IEEE Trans. on Wireless Commun.*, vol. 6, No. 2, pp. 659-669, Feb. 2007.

\* cited by examiner

Typical channel power gain of a time-varying multipath fading channel.

FIG. 2

| | | Block Index (Frequency) | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| User Index | 1 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 2 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 3 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 4 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| Symbol Index (Time) | 5 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 6 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 7 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 8 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 9 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 10 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 11 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 12 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 13 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 14 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 15 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| | 16 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |

The band-type resource structure for 16 symbols/packet.

The channel power gain of the band-type structure for one user in a time-varying channel.

FIG. 4

The interleaved-type resource structure for 16 symbols/packet.

The channel power gain of the interleaved-type structure for one user in a time-varying channel.

FIG. 6

Example of the proposed evolving-type resource structure of block index sets for four subchannels.

Illustration of a cell that consists of a BS serving four moving users.

Illustration of the usage of multiple evolving-type resource structures based on the channel feedback of the moving users and/or the time conditions (e.g., day time, night time, rush hour, etc.).

EVOLVING-TYPE USER RESOURCE STRUCTURE/CHANNELIZATION WITH ENHANCED DIVERSITY FOR OFDMA BASED TIME-VARYING CHANNELS

CROSS-REFERENCE TO RELATED APPLICATION

The present invention relates to and claims priority of U.S. Provisional Patent Application ("Provisional Patent Application"), entitled "An Evolving-Type User Resource Structure/Channelization with Enhanced Diversity for OFDMA Based Time-Varying Channels," Ser. No. 61/076,540, filed on Jun. 27, 2008. The Provisional Patent Application is hereby incorporated by reference in its entirety.

BACKGROUND OF THE INVENTION

1. Field of the Invention

The present invention relates to structuring of system resources for allocation to a user of a multi-access telecommunication system. In particular, the present invention relates to structuring of frequency resources for allocation to a user in a multi-access telecommunication system, in response to changing channel conditions (i.e., a "time-varying channel").

2. Discussion of the Related Art

A strong signal path is essential for reliable communication. In a channel having rapidly changing conditions, a signal path may experience a deep fade. When a signal path experiences a deep fade, the bit-error rate is high. Diversity techniques, such as transmitting the symbols over multiple signal paths, improve performance in fading channels. When the signal paths fade independently, reliable communication is maintained when at least one of the signal paths remains strong.

There are many ways to achieve diversity. For example, U.S. Pat. No. 5,457,712, entitled "Method for providing time diversity" ("Weerackody") to V. Weerackody, issued on Oct. 10, 1995, discloses that temporal diversity may be achieved using interleaving and error-correcting codes. Weerackody proposes dispersing the coded symbols over time in different coherence periods, so that different parts of the symbols experience independent fades.

Similarly, U.S. Pat. No. 6,788,751, entitled "Frequency Diversity Digital Wireless System" ("Hustig") to C.H. Hustig et al., issued on Sep. 7, 2004, discloses frequency diversity techniques in frequency-selective channels, such as coded-orthogonal frequency division multiplexing (C-OFDM), multiband-OFDM (MB-OFDM), and using a rake receiver.

In addition, U.S. Pat. No. 6,853,694, entitled "Spatial diversity wireless communications (radio) receiver" ("Beandin") to A. Beaudin et al., issued on Feb. 8, 2005, discloses a spatial diversity technique which uses multiple transmit or receive antennas that are spaced sufficiently far apart. U.S. Pat. No. 6,104,933, entitled "Method and apparatus for control of base stations in macro diversity radio systems" ("Frodigh") to M. Frodigh et al., issued on Aug. 15, 2000, discloses macro diversity in a cellular network. In Frodigh, macro diversity is achieved by receiving the signal from a mobile station (MS) at two base stations (BSs). Frodigh's technique may be implemented, for example, in multiuser multiple-input-multiple-output (MU-MIMO), network-MIMO (NW-MIMO) systems.

More recently, multiuser diversity techniques are disclosed, for example, in the articles (a) "Information capacity and power control in single-cell multiuser communications," by R. Knopp and P.A. Humblet, *Proc. IEEE Intl. Conf. Commun.*, Seattle, Wash., June 1995, pp. 331-335; (b) "Optimal power allocation over parallel Gaussian broadcast channels," by D.N.C. Tse, in *Proc. Intl. Symp. Inf. Theory*, Ulm, Germany, June 1997, pp. 27-27; and (c) "Opportunistic beamforming using dumb antennas," by P. Viswanath, D.N.C. Tse, and R. Laroia, *IEEE Trans. Inform. Theory*, vol. 48, no. 6, June 2002, pp. 1277-1294. Another example of multiuser diversity technique is disclosed in U.S. Patent Application Publication 2007/0064780, entitled "Channel quantization for multiuser diversity" ("Zheng") by J. Zheng et al. published on Mar. 22, 2007. Zheng discloses quantizing channel state information (CSI) into quantization levels in a finite-rate feedback multiuser system, using performance metrics, such as signal-to-noise ratio (SNR), bit error rate (BER), or system capacity. Other examples of multiuser diversity techniques include (a) U.S. Patent Application Publication 2006/0116077, entitled "Exploiting multiuser diversity through phase modulation multiplexing," by H. Liu, M. Shen, G. Xing, published on Jun. 1, 2006, which discloses a method for combining signals of multiple users onto a common channel using phase modulation multiplexing, and (b) U.S. Patent Application Publication 2006/0120395, entitled "Method and system for switching antenna and channel assignments in broadband wireless networks" ("Xing"), by G. Xing, M. Shen, H. Liu, published on Jun. 8, 2006, which discloses a method and apparatus for antenna switching, grouping, and channel assignments. Xing proposes using simple antenna operations to increase the capacity and performance of wireless communications systems.

Diversity techniques are such powerful tools that a typical wireless system may use multiple forms of diversity to achieve the intended performance.

Wireless systems that operate under the orthogonal frequency division multiple access (OFDMA) scheme enjoy good resource resolution in the time-frequency grid. Better diversity is expected to be achieved under an OFDMA system, given proper resource allocation and resource structuring. Resource allocation or sub-carrier and power allocation for OFDMA systems are disclosed, for example, in the following U.S. patents or U.S. patent application publications: (a) U.S. 2005/0265223, entitled "Method and apparatus for scheduling downlink channels in an orthogonal frequency division multiple access system and a system using the same," by J.-H. Song, A1, published on Dec. 1, 2005; (b) U.S. 2006/0109865, entitled "Method for allocating resources in a multicarrier system and transmission apparatus using the same," by S.-Y. Park, Y.-W. Lee, S.-B. Yun, Y.-S. Kim, published on May 25, 2006; (c) U.S. Pat. No. 6,917,812, entitled "Air interface scheduler for wireless communication networks," to A. Damnjanovic, issued on Jul. 12, 2005; (d) U.S. Pat. No. 6,987,738, entitled "Method for packet scheduling and radio resource allocation in a wireless communication system," to V.G. Subramanian, R. Agarwal, R.J. La, issued on Jane 17, 2006; (e) U.S. 2006/0149620, entitled "Scheduling apparatus and method in a multicarrier communication system," by C.-H. Suh, S.-H. Park, S.-H. Yoon, S.-K. Hong, Y.-K. Cho, published on Jul. 6, 2006; (f) U.S. 2008/0076438, entitled "Method for dynamic resource allocation of uplink and downlink in OFDMA/TDD cellular system," K.H. Chang, S.J. Ko, T.H. Sun, J.H. Kim, published on Mar. 27, 2008; and (g) U.S. 2008/0043610, entitled "Multi-carrier communications with group-based subcarrier allocation" ("Li"), by X. Li, H. Liu, H. Yin, G. Xing, F. Mu, published Feb. 21, 2008. Li discloses a method for subcarrier selection in an OFDMA system which partitions subcarriers into groups of at least one cluster of subcarriers for use in communication with the subscriber[1].

[1] Subscriber is also known as MS or user equipment (UE).

None of the OFDMA systems discussed above takes advantage of multiuser diversity, nor do they address time-varying channel conditions. The following publications disclose using multiuser diversity to develop resource allocation or scheduling in schemes that assume perfect or partial knowledge of channel conditions (e.g., quasi-static or very slowly varying channel conditions). (a) the article "Opportunistic beamforming and scheduling for OFDMA systems" ("Svedman") by P. Svedman, S.K. Wilson, L.J. Cimini, and B. Ottersten, *IEEE Trans. Commun.*, vol. 55, no. 5, May 2007, pp. 941-952; (b) the article "Adaptive resource allocation for multiuser MIMO/OFDM networks based on partial channel state information" ("Chemaly"), by R. Chemaly, K. Letaief, and D. Zeghlache, *Proc. IEEE GLOBECOM 2005*, St. Louis, Mo., November 2005, pp. 3922-3926; (c) U.S. Patent Application Publication 2007/0110003, entitled "Subcarrier allocation in OFDMA with imperfect channel state information at the transmitter" ("Tujkovic I"), by D. Tujkovic, A. Paulraj, published May 17, 2007; and (d) U.S. Patent Application Publication 2008/0002619, entitled "Time domain interference averaging with multiuser diversity in OFDMA systems" ("Tujkovic II"), by D. Tujkovic and A. Paulraj, published on Jan. 3, 2008. Tujkovic I discloses, for example, a method that combines multiuser diversity and frequency diversity to a resource allocation scheme. The method benefits from multiuser allocation by assigning a fraction of the available bandwidth to users in high SNR channels. Recognizing that CSI at the transmitter is not perfect, the system and method in Tujkovic I allocate the remaining bandwidth pseudo-randomly according to a frequency diversity scheme.

In Tujkovic II, interference among users of an OFDMA system operating under multiuser diversity within a coherence bandwidth is reduced by spreading out the users' transmission symbols randomly in time within the coherence bandwidth. When transmission symbols are randomly dispersed, the average variance of interference among users in the same sub-band is reduced.

In addition to Chemaly (discussed above), the following articles incorporate time-variation or Doppler spread in their resource allocation: (a) "Sub-band rate and power control for wireless OFDM systems" ("Oh"), by J. Oh and J.M. Cioffi, *Proc. IEEE Vehicular Technology Conference* (VTC 2004-Fall), Los Angeles, Calif., Vol. 3, 26-29 Sep. 2004, pp. 2011-2014; and (b) "Fair adaptive radio resource allocation of mobile OFDMA" ("Chu"), by F.-S. Chu and K.-C. Chen, *Proc. IEEE Personal, Indoor and Mobile Radio Communications (PIMRC 2006)*, Helsinki, Finland, September 2006, pp. 1-5. Chemaly, Oh and Chu each require knowledge of the Doppler spread. Even with knowledge of Doppler spread, these methods still suffer from performance degradation at high mobile speeds. The mismatches between the models used in these methods and the actual ones for the channel time-correlation model and the exact maximum Doppler shift may introduce additional performance degradation. Therefore, while Chemaly, Oh and Chu incorporate time-variation, these methods require the knowledge of the Doppler spread and suffer from performance degradation at high mobile speeds.

Several user resource structures or channelization have been disclosed that take advantage of diversity. However, the disclosures differ in the terminology used. For example, band division multiple access (BDMA) is disclosed in the article "BDMA testbed-configuration and performance results," by T. Kunihiro, T. Yamaura, M. Suzuki, E. Fujita, *Proc. IEEE Vehicular Technology Conference, VTC Spring*, Vol. 3, 16-20 May 1999, pp. 1836-1840. Other disclosures describe interleaved frequency division multiple access (IFDMA), adaptive FDMA (AFDMA), and interleaved-type, band type, or distributed structure and localized structure. In addition, the article "Resource allocation and power control in a TDD OFDM-based system for 4G cellular networks," by P. Bisaglia, S. Pupolin, D. Veronesi, M. Gobbi, *Proc. IEEE Vehicular Technology Conference, VTC Spring*, Vol. 4, 7-10 May 2006, pp. 1595-1599, discloses adaptive block division multiple access (ABDMA). The article "Performances of multicarrier system with time and frequency domain spreading for wireless communications," by Y. Teng, K. Naito, K. Mori, H. Kobayashi, *Proc. International Conference on Wireless Networks, Communications and Mobile Computing*, Vol. 1, 13-16 Jun. 2005, pp. 558-563, discloses non-frequency scattering and hopping (NFSH), frequency scattering (FS), frequency scattering and hopping (FSH), WiMAX and IEEE 802.16e standards introduce concepts such as distributed permutation and contiguous/adjacent permutation.

Despite the large number of terms used, user resource structures may be classified into two main categories: band-type (a.k.a. localized-structure) and interleaved-type (a.k.a. distributed-structure). In a band-type resource structure, a band of subcarriers are allocated to a user. In an interleaved-type resource structure, however, the subcarriers allocated to a user may spread out across a band and interleaved with subcarriers allocated to other users. In an interleaved type, a user may be allocated non-contiguous subcarriers, or several non-adjacent groups of a few contiguous subcarriers, which are spread out across an entire band. Under a more general scheme, the assigned subcarriers may shift from symbol-to-symbol in a systematic way across all users. In general, different user resource structures have different advantages and disadvantages, based on such factors as application usage, channel condition, and mobility scenario.

To provide multiuser diversity in an OFDMA systems, subcarriers assigned to a user should preferably be contiguous (i.e., band-type). When a channel varies substantially over the duration of a transmission frame, the band-type resource structure loses most multiuser diversity gains because of the outdated/mismatched channel information assumptions made for the resource allocation. Under such conditions, a channel allocated to a user may be in deep fade at a later part of the frame. To alleviate the effects of a deep fade, a shorter frame length and a more frequent channel information update (feedback) may be used. However, a substantial throughput loss resulting from a large overhead may become unacceptable. Typically, each frame contains overhead information such as a preamble and control information (e.g., DL-MAP, UL-MAP). Thus, a short frame length is inefficient from an overhead viewpoint.

To operate in a rapidly changing channel, another approach keeps a user's assigned subcarriers spread out over an entire band (i.e., interleaved-type). Such an approach is disclosed, for example, in the article "A new ranging method for OFDMA systems" ("Fu") X. Fu, Y. Li, and H. Minn, *IEEE Trans. on Wireless Commun.*, vol. 6, no. 2, pp. 659-669, February 2007. Fu's approach addresses the deep fade problem using frequency diversity. Multiuser diversity gain is lost, however. Thus, the existing user resource structures (both band-type and interleaved-type) have limited diversity exploitation capability in a changing channel.

In summary, band-type resource structure requires frequent feedback of channel information to maintain the multiuser diversity gains; such frequent feedback is not practical in a rapidly changing channel. Interleaved-type resource structure is more robust in rapidly changing channels because of frequency diversity gain; such resource structure provides little multiuser diversity gain. Both interleaved-type and band-type user resource structures have limited diversity exploitation capability, especially in rapidly changing channels.

SUMMARY

According to one embodiment of the present invention, a method provides an evolving-type resource structure to allocate a range of frequencies for communication in a telecommunication system. The method first divides the range of frequencies into non-overlapping, contiguous frequency blocks. At a first time point, the frequency blocks are allocated among a plurality of subchannels, such that each subchannel is allocated contiguous frequency blocks covering a predetermined range of frequencies. Thereafter, at each subsequent predetermined time points subsequent to the first time point, the frequency blocks are reallocated among the subchannels, with each reallocation increasing the predetermined range of frequencies allocated to each subchannel over the predetermined range of frequencies allocated to the subchannel at the immediately previous time point. In one embodiment, the predetermined range of frequencies allocated to each subchannel at each reallocation is increased over the predetermined range of frequencies allocated to the subchannel at the immediately previous time point by less than a predetermined factor. The predetermined factor may be, for example, one-quarter of the maximum between the coherence bandwidth and the previous range.

In one embodiment, at the last time point subsequent to the first time point, the frequency blocks of the subchannels are interleaved. The elapsed time between the first time point and the next time point that is subsequent to the first time point is determined based on channel statistics. The channel statistics may be represented by a temporal correlation value of the channel gains at the two time points. The elapsed time between successive reallocation of frequency blocks may be based on an estimate of an average speed of mobile users in the telecommunication system. The telecommunication system may be an OFDMA system and the time points are separated in time by an integral multiple of OFDM symbol durations. The telecommunication system may include a BS and a number of MSs and the method may be controlled by the base station under a centralized control scheme. Alternatively, the method may be controlled by the mobile users under distributed control scheme.

The resulting subchannel enjoys multiuser diversity at the beginning of each OFDMA frame and enjoys a mixture of both multiuser and frequency diversities in the remainder of the OFDMA frame.

The present invention is better understood upon consideration of the detailed description below and the accompanying drawings.

BRIEF DESCRIPTION OF THE DRAWINGS

FIG. 2 shows an example of an OFDMA frame.

FIG. 4 illustrates an interleaved-type resource structure, in which each user is allocated a total of eight frequency blocks distributed across the entire frequency band for one packet.

FIG. 6 illustrates an evolving-type resource structure, in accordance with one embodiment of the present invention.

DETAILED DESCRIPTION OF THE PREFERRED EMBODIMENTS

Figure 1:
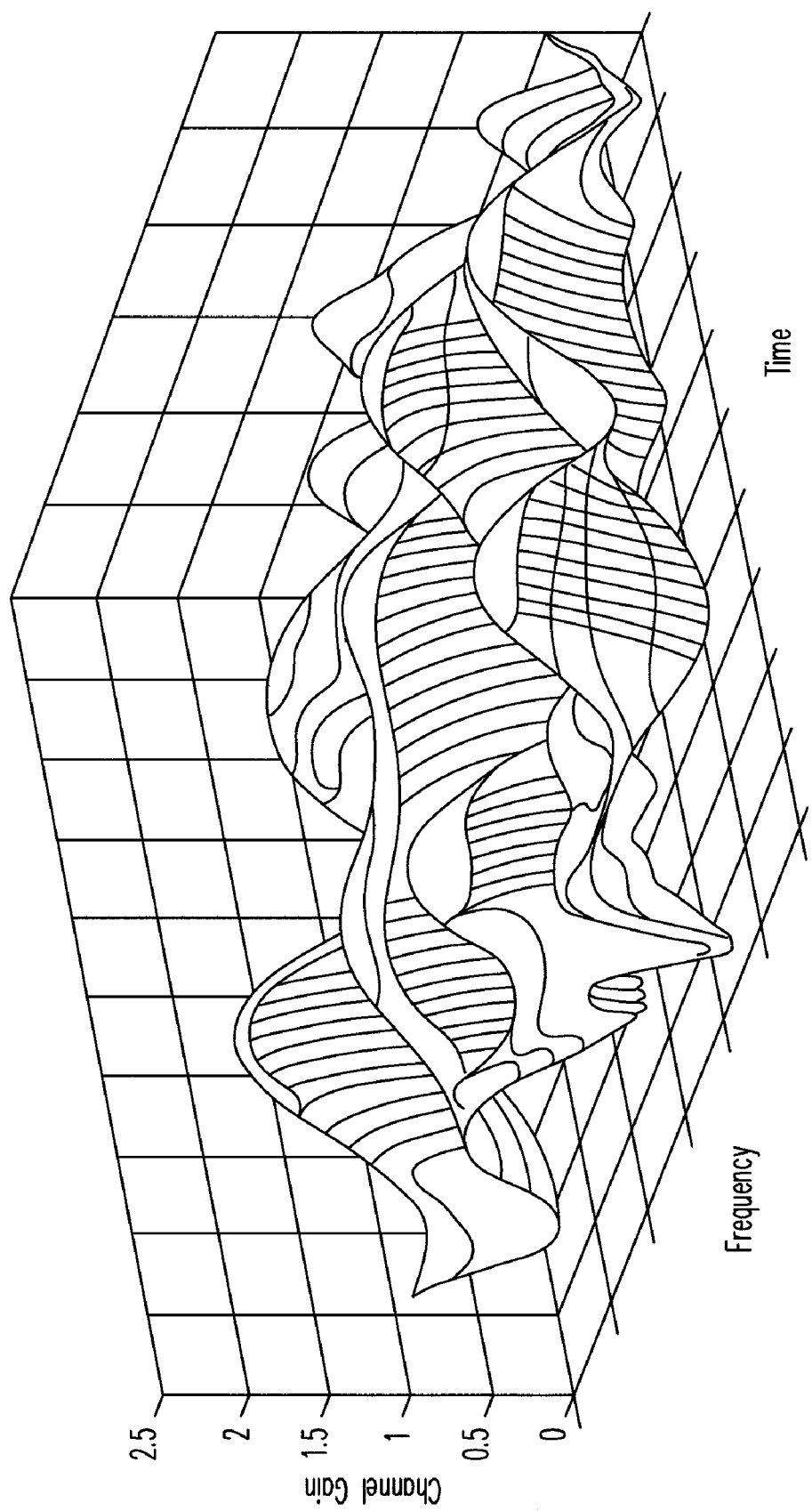
FIG. 1 shows a typical time-varying, frequency-selective multipath fading channel power gain, plotted against frequency (i.e., subcarriers) and time (i.e., OFDM symbol intervals).

FIG. 1 shows a typical time-varying, frequency-selective multipath fading channel power gain, plotted against frequency (i.e., subcarriers) and time (i.e., OFDM symbol intervals). FIG. 1 shows both frequency selectivity due to multipath delay spread and time selectivity due to Doppler spread. The limited delay spread results in correlation of adjacent subcarrier channel responses, while the Doppler spread causes variations of the channel gains over time, and consequently subcarriers with very good channel gains experience deep channel fading at a later time.

Figure 3:
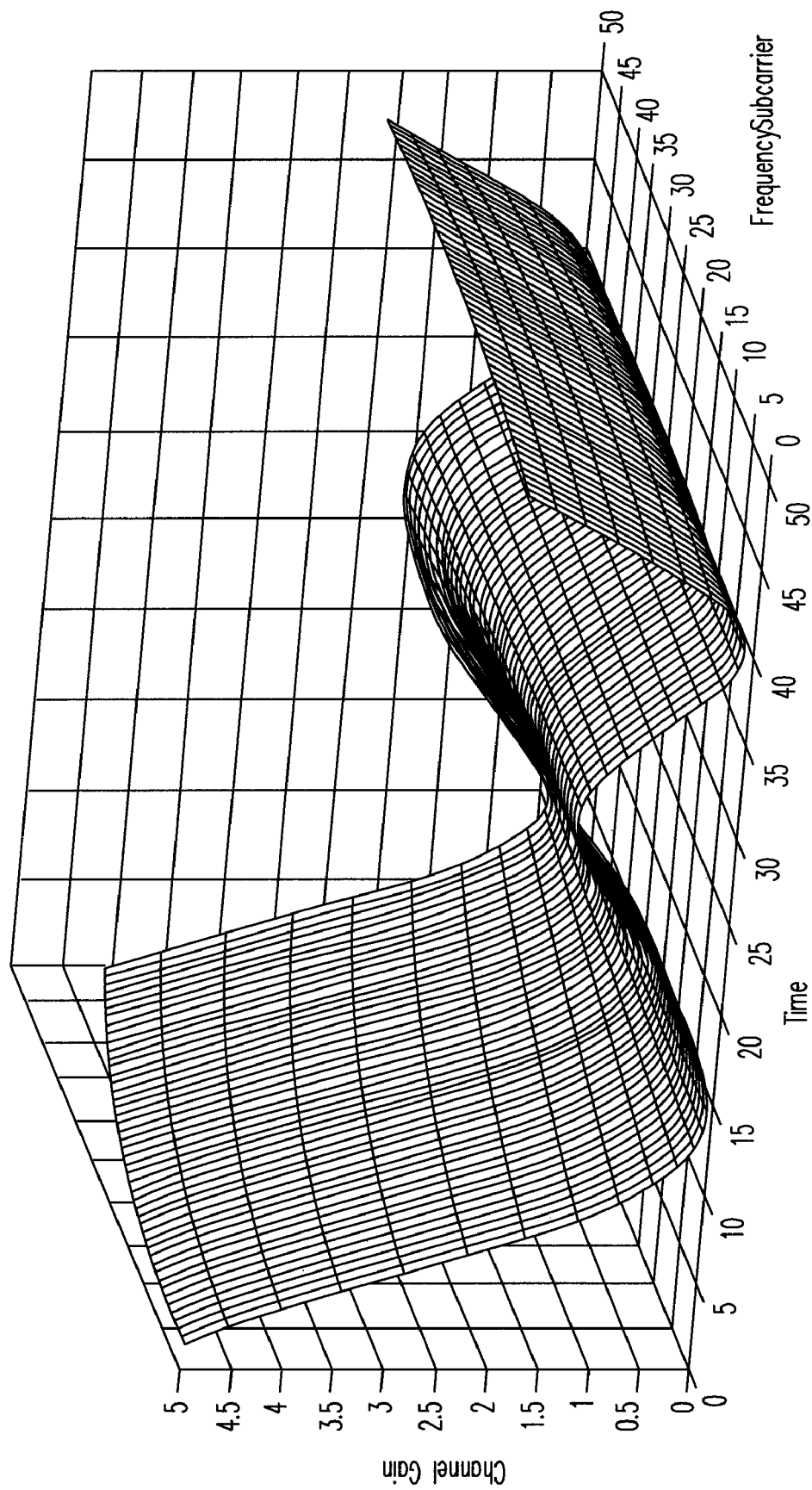
FIG. 3 illustrates how a band-type structure achieves multiuser diversity gain at the earlier part of the frame but suffers from the deep fades at a later part of the frame in a time-varying channel.

FIG. 2 shows an example of an OFDMA frame (see also FIG. 4 and FIG. 6). An OFDMA frame includes N=256 subcarriers within one OFDM symbol, which may be divided into K=32 frequency blocks of N/K=8 consecutive subcarriers each. FIG. 2, shows resources of M=16 symbols each made up of K=32 frequency blocks. The resources are grouped into (i.e., "channelized") U=4 subchannels, with each subchannel being assigned eight frequency blocks in each symbol. Typically, each user is assigned to one or more subchannels according to its data rate requirement and its CSI. Under the resource structure of FIG. 2, for example, each user may be assigned one subchannel, or 64 subcarriers. Thus, FIG. 2 illustrates a band-type resource structure, in which each user is allocated eight adjacent frequency blocks for a packet (i.e., all subcarriers allocated to a given user are adjacent to each other). Under a band-type resource structure, a user transmits in the band where its channel gain is highest, according to channel information that is available at the beginning of a frame. As different users face different channel responses, their best subcarrier bands are very likely to be different, so that multiuser diversity is achieved. Such a resource structure may be implemented in either a centralized or a distributed access scheme. However, the channel gain in a chosen band may fade at a later time due to Doppler spread. At such time, all subcarriers in the chosen band may experience deep fade, since a high correlation exists between adjacent subcarriers. Significant degradation in both error performance and system throughput may result. Although using a shorter frame length may mitigate such degradation, the cost is an increased overhead ratio, resulting in decreased system throughput. FIG. 3 illustrates how a band-type structure achieves multiuser diversity gain at the earlier part of the frame but suffers from the deep fades at a later part of the frame in a time-varying channel.

Figure 5:
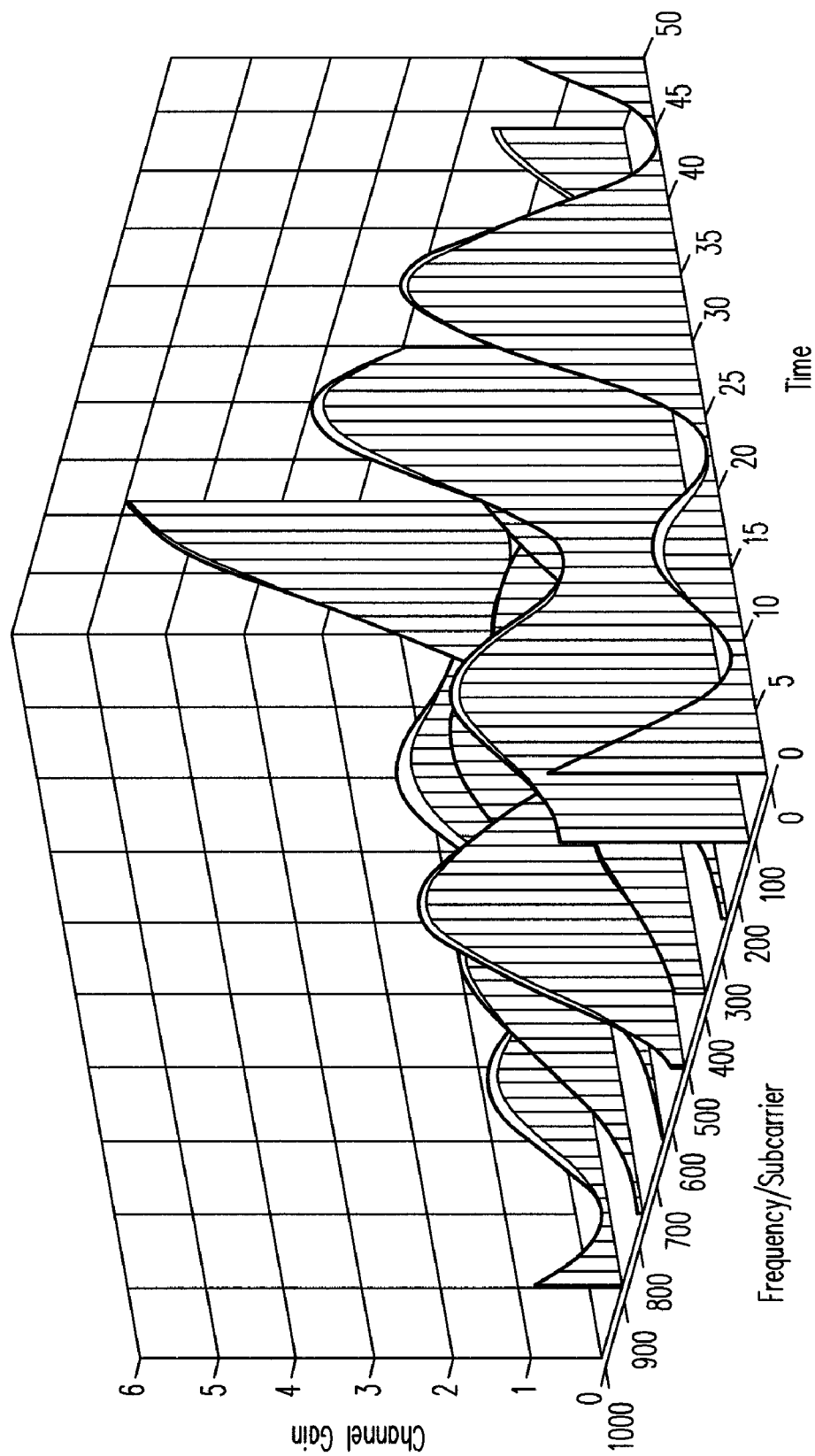
FIG. 5 illustrates how an interleaved-type structure achieves robustness to deep fading, but lacks multiuser diversity.

FIG. 4 illustrates an interleaved-type resource structure, in which each user is allocated a total of eight frequency blocks distributed across the entire frequency band for one packet. An interleaved-type structure may be used to counter deep fades in an OFDMA system. In an interleaved-type structure, subcarriers allocated to a particular user are distributed across the entire frequency band to provide a degree of robustness against deep fades. Such robustness, however, is achieved at the expense of multiuser diversity gain, as some subcarriers may experience poor channel gain while other subcarriers may experience good channel gains. Consequently, all users experience on the average similar channel conditions. In several applications, some form of channel knowledge is available at the beginning of each frame. Such channel knowledge cannot provide much improvement in terms of multiuser diversity in an interleaved-type structure, particularly in relatively slow time-varying channels, where the advantage of multiuser diversity is more pronounced. An interleaved-type resource structure can also be implemented under either a centralized or a distributed access scheme. FIG. 5 illustrates how an interleaved-type structure achieves robustness to deep fading, but lacks multiuser diversity.

According to one embodiment of the present invention, an evolving-type user resource structure provides enhanced diversity gain in a time-varying channel. Such a user resource structure exploits the advantages from both a band-type structure and an interleaved-type structure (i.e., achieves multiuser diversity gain at the earlier part of the frame and robustness against deep fades at the later part of the frame). Under an evolving-type resource structure, at the beginning of a frame, a band-type structure is used to take advantage of the available channel knowledge, thus providing multiuser diversity gain. The resource structure then evolves from a band-type structure towards an interleaved-type structure at a suitable rate (e.g., at every $\alpha$ OFDM symbols). The structure may change into a further expanded structure, depending on the range of mobile speeds (relative to the carrier frequency and the subcarrier spacing). Because of correlations in both frequency and time domains, gradual changes in the evolving-type resource structure may still enjoy good channel gains from (partial) multiuser diversity. In rapidly changing channel conditions, the evolving resource structure arrives and remains an interleaved-type resource structure for the remainder of the transmission frame. At the interleaved-type resource structure, an evolving resource structure enjoys robustness against deep fading through frequency diversity. The evolving resource structure may also be implemented in either a centralized or a distributed access scheme.

FIG. 6 illustrates an evolving-type resource structure, in accordance with one embodiment of the present invention. As shown in FIG. 6, each subchannel has a band-type structure initially (i.e., having consecutive K/U frequency blocks) and gradually evolves into the interleaved type structure (i.e., approximately equally spaced K/U frequency blocks spread out across an entire band being allocated to each subchannel). The evolving-type structure may be defined by subcarrier-block index sets across time, with each block index set corresponding to a subcarrier-block of one OFDM symbol. TABLE 1 illustrates an example from FIG. 6, showing subchannel 2's subcarrier-block indices over time:

TABLE 1

An example from FIG. 6 of subchannel 2's evolving block index sets, with D = 5 for $\alpha_1$ = 4 and $\alpha_2$ =2.

| $\{J_{2,d}: d = 1: d_f\}$ | No. of repeated symbols | Symbol index with M = 16 | Block Index |
|---|---|---|---|
| $J_{2,1}$ = {9, 10, 11, 12, 13, 14, 15, 16} | $\alpha_1$ = 4 | 1 | 9, 10, 11, 12, 13, 14, 15, 16 |
| | | 2 | 9, 10, 11, 12, 13, 14, 15, 16 |
| | | 3 | 9, 10, 11, 12, 13, 14, 15, 16 |
| | | 4 | 9, 10, 11, 12, 13, 14, 15, 16 |
| $J_{2,2}$ = {7, 9, 11, 12, 13, 14, 16, 18} | $\alpha_2$ = 2 | 5 | 7, 9, 11, 12, 13, 14, 16, 18 |
| | | 6 | 7, 9, 11, 12, 13, 14, 16, 18 |
| $J_{2,3}$ = {5, 7, 9, 11, 14, 16, 18, 20} | $\alpha_2$ = 2 | 7 | 5, 7, 9, 11, 14, 16, 18, 20 |
| | | 8 | 5, 7, 9, 11, 14, 16, 18, 20 |
| $J_{2,4}$ = {2, 5, 8, 11, 14, 17, 20, 23} | $\alpha_2$ = 2 | 9 | 2, 5, 8, 11, 14, 17, 20, 23 |
| | | 10 | 2, 5, 8, 11, 14, 17, 20, 23 |
| $J_{2,5}$ = {3, 7, 11, 15, 19, 23, 27, 31} $d_f$ = D = 5 | M − $\alpha_1$ − $\alpha_2$ ($d_f$ − 2) | 11 | 3, 7, 11, 15, 19, 23, 27, 31 |
| | | 12 | 3, 7, 11, 15, 19, 23, 27, 31 |
| | | 13 | 3, 7, 11, 15, 19, 23, 27, 31 |
| | | 14 | 3, 7, 11, 15, 19, 23, 27, 31 |
| | | 15 | 3, 7, 11, 15, 19, 23, 27, 31 |
| | | 16 | 3, 7, 11, 15, 19, 23, 27, 31 |

As shown in Table 1, the evolving-type resource structure includes five stages (i.e., D=5). Initially, for a period spanning four OFDMA symbols (i.e., $\alpha_1$=4), subchannel 2's block index sets include adjacent subcarrier blocks 9-16. Thereafter, the block index set changes subcarrier assignments every two OFDMA symbols (i.e., $\alpha_2$=2), except for the final phase. Thus, as shown in Table 1, the block index sets for the $5^{th}$ to $6^{th}$, $7^{th}$ to $8^{th}$ and $9^{th}$ to $10^{th}$ OFDMA symbols are respectively {7, 9, 11-14, 16, 18}, {5, 7, 9, 11, 14, 16, 18, 20} and {2, 5, 8, 11, 14, 17, 20, 23}. During the final stage, spanning the $11^{th}$ to $16^{th}$ OFDMA symbols, the block index set is {3, 7, 11, 15, 19, 23, 27, 31}, thus arriving at an interleaved-type resource structure.

Figure 7:
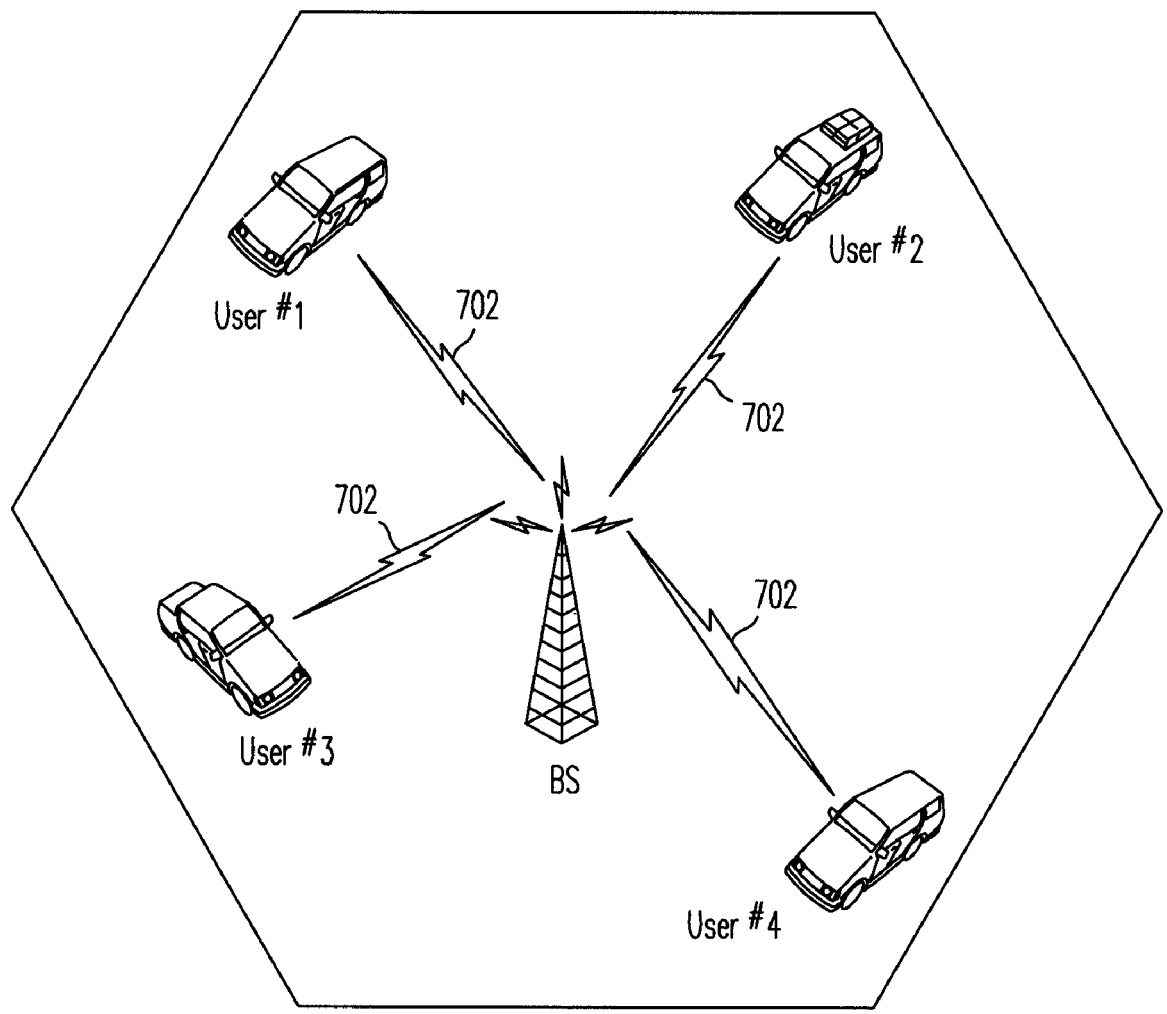
FIG. 7 illustrates a cell in which a BS serves four moving users, under a scheme that uses a fixed evolving-type structure, according to one embodiment of the present invention.
Figure 8A:
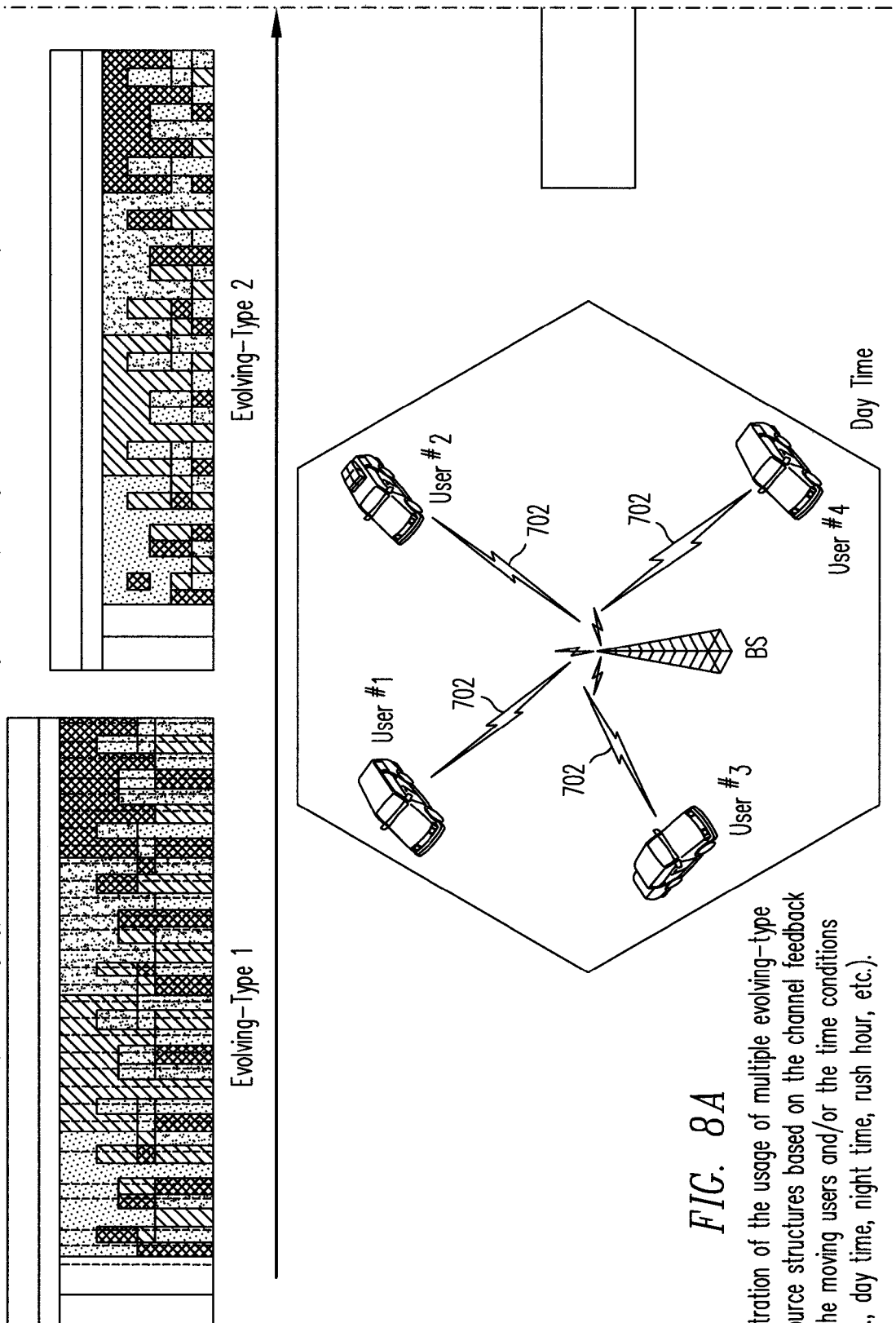
FIG. 8 illustrates using multiple-evolving type structures at a BS based on both channel feedback from the moving users and time-of-day conditions (e.g., day time, night time, or rush hour), according to one embodiment of the present invention.
Figure 8B:
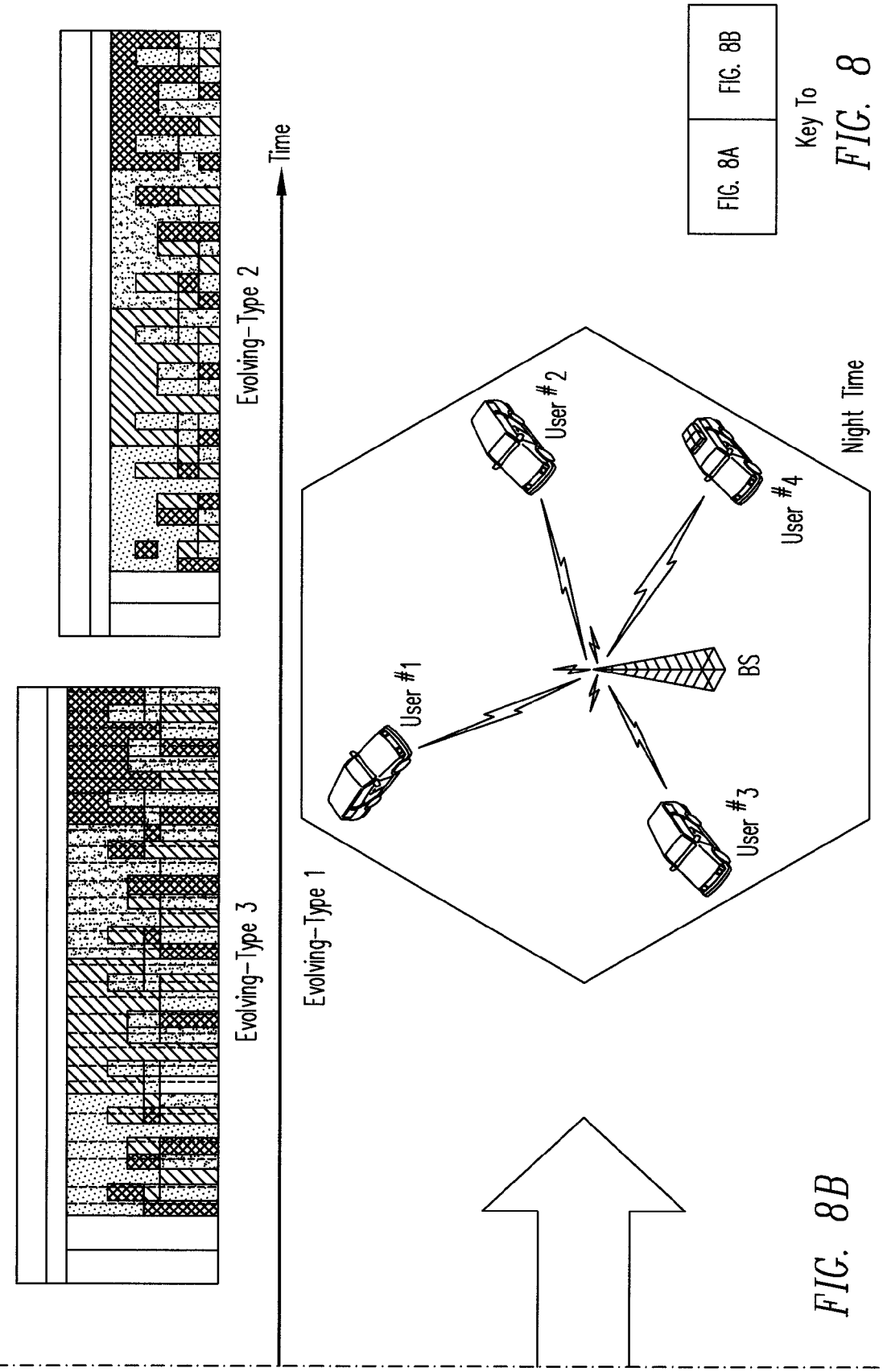

Preferably, an evolving-type resource structure is designed offline, so that the structure is known a priori to both the BS and the users. FIG. 7 illustrates a cell in which a BS serves four moving users, under a scheme that uses a fixed evolving-type structure, according to one embodiment of the present invention. In the example of FIG. 7, if the BS serves an urban microcell, the average speed of the mobile users is low, so that the evolving-type structure may target that average speed. However, if the BS serves a rural macrocell, the evolving-type structure may be designed to a high average speed for the mobile users. In FIG. 7, all users of the BS share the same evolving-type resource structure. When a user moves out of the coverage area of the BS into the coverage area of another BS, the user switches to the evolving-type structure in the new BS. Alternatively, a BS may use several (e.g., three) evolving-type structures (e.g., for slow, medium, fast speeds) and assign each user different evolving-type structures according to their respective speeds. In such an arrangement, the resource structures are referred to as "mixed evolving-type structures." When multiple evolving-type structures are used, the BS may get estimates of speed and channel information during random access/scheduling or the bandwidth request stage (702, FIG. 7) from channel feedback obtained from mobile users. The BS may use the information to assign appropriate evolving-type structures. Such a scheme requires, however, mobile speed estimation and additional control information. FIG. 8 illustrates using multiple-evolving type structures at a BS based on both channel feedback from the moving users and time-of-day conditions (e.g., day time, night time, or rush hour), according to one embodiment of the present invention.

Figure 9:
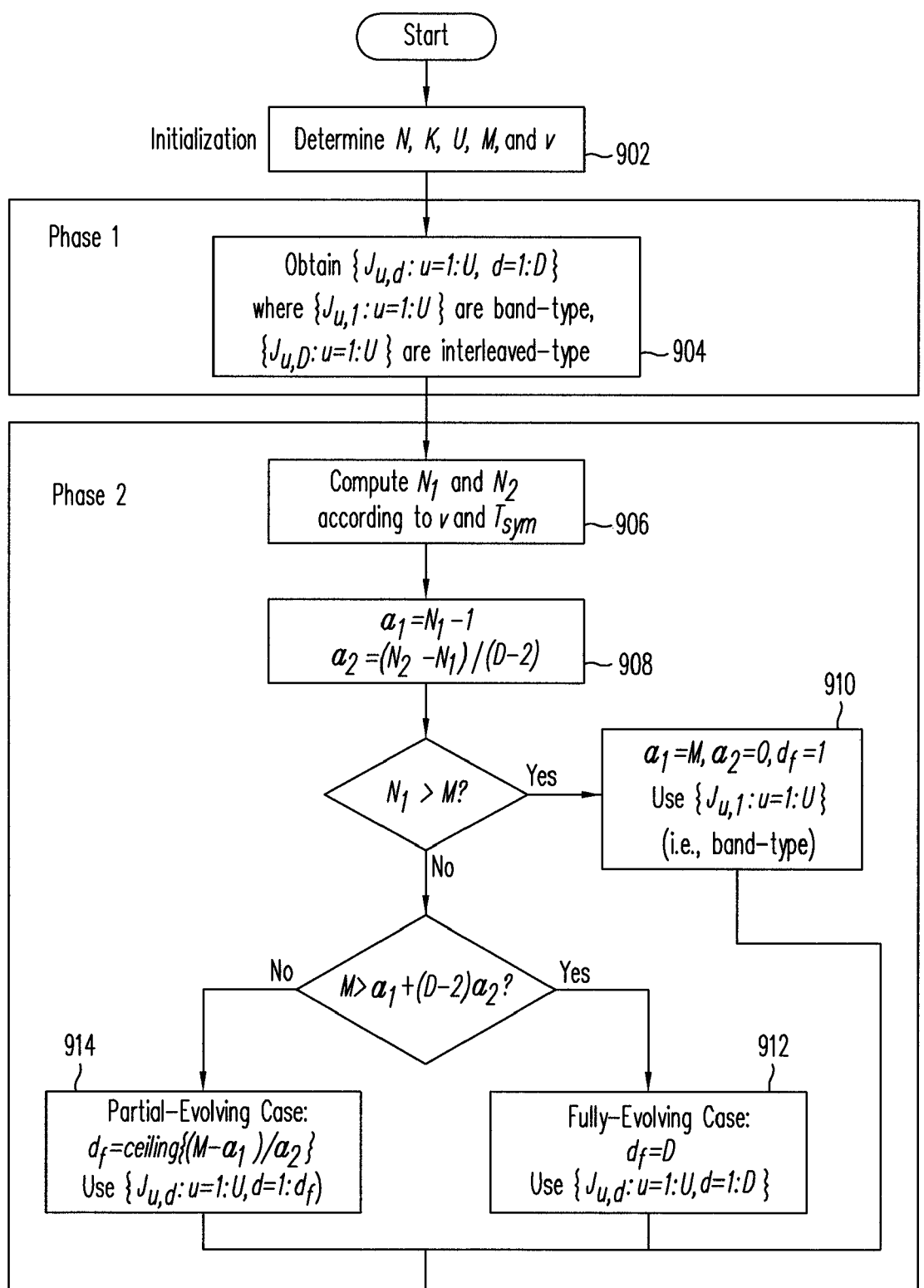
FIG. 9 provides a flow chart which illustrates the design criteria for evolving-type resource structures, according to one embodiment of the present invention.

The design criteria for evolving-type resource structures may be divided into two phases ("Phase 1" and "Phase 2") which are detailed as follows and summarized in the flowchart of FIG. 9. As shown in FIG. 9, at initialization (step 902), the designer determines N (i.e., the total number of subcarriers), K (i.e., the total number of frequency blocks), U (i.e., the total number of subchannels), M (i.e., the total number of OFDM symbols) and v (i.e., the target mobile speed$^2$), based on the required application and channel environments. For example, referring to FIG. 6, the total available resources are divided into K frequency blocks of N/K adjacent subcarriers each. These K frequency blocks are divided into U subchannels of K/U frequency blocks each.

[2] Alternatively, average target mobile speed per cell can also be used.

Under Phase 1 (step 904), based on the values of N, K, and U, the gradually evolving subcarrier block indexes $\{J_{u,d}: u=1:U, d=1:D\}$ are obtained for all U subchannels based on the following rules:
 i) All subchannels start with a band-type structure (i.e., d=1);
 ii) Different subchannels are always disjoint;
 iii) At each stage, the block span is expanded in both decreasing index and increasing index directions (cyclically). The amount of expansion is preferably a fraction (e.g., ¼) of the maximum between the coherence bandwidth and the block span in the previous stage (see, e.g., FIG. 6). A heuristic approach may be used to determine the block expansion for each stage; and
 iv) the final stage is an interleaved-type structure (i.e., d=D)

After appropriately applying the above rules, one obtains the selected distinct stages (i.e., D) and the corresponding block index sets for each subchannel. See, e.g., the example of FIG. 6, and the corresponding evolving block index sets subchannel 2 shown in TABLE 1.

In Phase 2 (Step 3-iii), the evolving structure uses $d_f$ distinct stages $\{J_{u,d}: u=1:U, d=1:d_f\}$ with the value of $d_f$ ($1 \leq d_f \leq D$), depends on the mobile speed, the symbol duration, and the number of OFDM symbols in the packet (frame). For example, for M=16 symbols/frame, if the mobile speed is low, the evolving-type structure is band-type (i.e., $d_f=1$). For a higher mobile speed, the evolving-type structure may have a value for $d_f$ between 1 and D, inclusive, depending on both the mobile speed and the total number of symbols/in the frame. The index set for each stage may stay unchanged for a number of OFDM symbols.

In Phase 2, the evolving subcarrier block indices obtained in Phase 1 are mapped to the total number of OFDM symbols, based on the initialization parameters:
 i) At step 906, parameters $N_1$ and $N_2$ are computed according to target mobile speed, v and OFDM symbol duration, $T_{sym}$. Here, $N_1$=round($T_{90}/T_{sym}$), where round(•) may be any of the rounding up, rounding down, or the nearest integer functions, $T_X$ is the time interval between p=1 and p=X/100[3], and $T_{sym}$ is the OFDM symbol duration including (cyclic-prefix or null) guard interval. The CSI delay of an OFDM symbol is incorporated by subtracting one from $N_1$. Similarly, $N_2$=round($T_{50}/T_{sym}$).

[3] Here, X=90 and 50, for $N_1$ and $N_2$, respectively ii) At step 908, values for $\alpha_1$ and $\alpha_2$ are assigned, based on, for example, the time intervals for which the correlation coefficient ρ of the channel response reaches a given value. For example, $\alpha_1$ can be designed as ($N_1-1$). Similarly, $\alpha_2$ can be designed as ($N_2-N_1$)/(D-2). When ρ≧0.9, the channel gains are highly correlated, so that the evolving-type resource structure maintains the same band-type within cc, symbols. However, when ρ drops below 0.5, the CSI knowledge at the beginning of the packet becomes ineffective. At that time interval, the evolving-type resource structure preferably uses frequency diversity (as multiuser diversity may have become unavailable), so that an interleaved-type structure is preferred. Correspondingly, there are ($N_2-N_1$) symbols for the intermediate D-2 stages, thus providing the above equation for $\alpha_2$.

iii) The number of OFDM symbols when d=1 stage is denoted by $\alpha_1$, while the number of OFDM symbols for each $1 \leq d \leq d_f$ stage is kept the same and denoted by $\alpha_2$. If the total number of OFDM symbols per packet M is smaller than $N_1$, all M symbols of u-th subchannel uses $J_{u,1}$ which corresponds to $\alpha_1$=M, $\alpha_2$=0 and $d_f$=1 (i.e., band-type structure) (i.e., result 910). However, if M is larger than $\alpha_1+(D-2)\alpha_2$, M-$\alpha_1+(D-2)\alpha_2$ symbols remain at the $d_f$=D stage (i.e., the fully-evolving case) (result 912). If M is less than $\alpha_1+(D-2)\alpha_2$, the evolving structure does not reach the interleaved-type resource structure (i.e., partial-evolving case) (result 914). In the third case, the last stage corresponds to $d_f$=ceiling{(M-$\alpha_1$)/$\alpha_2$} with M-$\alpha_1$-(d-2)$\alpha_2$ symbols.

As the evolving-type structures are designed offline, such that they are known a priori by both the BS and the users. By properly choosing the evolving rate, the resulting resource structure can be targeted at a particular mobile speed based on the environment of interest. The evolving rate may also be adaptively adjusted for better performance.

To provide multiuser diversity, channel knowledge across the entire band is desirable. A resource structure that provides multiuser diversity is the band-type resource structure. However, because of the band-type resource structure, the time-division duplexing (TDD) downlink (DL) channel knowledge across the entire band cannot be obtained directly from the uplink (UL) pilot or data signal, and an explicit CSI feedback is required. In contrast, under the evolving-type resource structure approach, channel information across the entire band may be extracted, as the resource structure becomes an interleaved-type at a later part of the frame, from which channel response across the entire band may be obtained. Consequently, overhead is saved, as no explicit pilot overhead is required to obtain channel knowledge, and cross-layer adaptation is enhanced.

The IMT[4]-Advanced systems are expected to support mobility of 120 km/hr and higher speeds (up to 350 km/hr). The evolving-type resource structure provides performance enhancements for reliable high data rate wireless links in high-speed mobile environments of IMT-Advanced systems. In general, the evolving-type resource structure may be applied to various channel environments supporting different mobile speeds. The evolving-type resource structure primarily defines the user resource structure (channel) to provide better diversities. There is restriction on neither the controlling entity (e.g., a BS, in a centralized approach or by subscribers, in a distributed approach), which assigns the resources, nor limitation on its use for DL transmission or UL transmission. Hence, the evolving-type resource structure may be used for a centralized access scheme, a distributed access scheme, or a semi-distributed access scheme. The evolving-type resource structure may be applied in both DL and UL transmissions, and in TDD and as frequency-division duplexing (FDD), provided that some form of channel information—full or limited—is available at the beginning of each frame. For the remainder of the frame, prior channel knowledge is not required.

[4] International Mobile Telecommunication

We claim:
1. A method for sub-channelization or structuring a range of OFDMA subcarriers for allocation to mobile users in a telecommunication system, wherein the OFDMA subcarriers are arranged into a plurality of subcarrier blocks, each subcarrier block including as plurality of OFDMA subcarriers, the method comprising:
 within a network node serving the mobile users, at a first time point, allocating the subcarrier blocks among a plurality of subchannels, such that each subchannel is allocated to a corresponding one of the mobile users and includes a plurality of contiguous subcarriers blocks covering a range of frequencies; and within the network node, at each of a plurality of time points subsequent to the first time point, reallocating and interleaving the subcarrier blocks among the subchannels, each reallocation increasing the range of frequencies allocated to each subchannel over the range of frequencies allocated to the subchannel at the immediately previous time point.

2. The method of claim 1 wherein the network node comprises a base station.

3. The method of claim 1, wherein the range of frequencies allocated to each subchannel at each reallocation increases over the range of frequencies allocated to the subchannel at the immediately previous time point by less than a predetermined amount.

4. The method of claim 3, wherein the predetermined amount is less than or equal to one-quarter of either the range at the immediately previous time point or a coherence bandwidth.

5. The method of claim 1, further comprising determining within the network node an elapsed time between the first time point and the first one of the time points subsequent to the first time point based on channel conditions or channel statistics.

6. The method of claim 5, wherein the channel conditions or channel statistics are based on one or more parameters selected from the group consisting of mobile speed, symbol duration and carrier frequency.

7. The method of claim 5, wherein the channel conditions or channel statistics are evaluated using a temporal correlation value of channel gains at two of the time points.

8. The method of claim 1, further comprising determining an elapsed time between successive time points based on an estimate of an average speed of mobile users in the communication system.

9. The method of claim 1, wherein the telecommunication system comprises an OFDMA system.

10. The method of claim 9, wherein the time points are separated in time by an integral multiple of OFDM symbol durations.

11. The method of claim 1, wherein the telecommunication system comprises a base station and a plurality of mobile stations and wherein the method is under centralized control by the base station.

12. The method of claim 1, wherein the telecommunication system comprises a base station and a plurality of mobile stations and wherein the method is under distributed control by the mobile stations.

13. A system comprising:
a plurality of mobile users; and
a base station, wherein the base station is configured to: at a first time point, allocate to each mobile user a corresponding plurality of contiguous frequency blocks covering a predetermined subrange of frequencies within a range of frequencies, each frequency block comprising a plurality of OFDMA subcarriers and
to reallocate and interleave to each mobile user, at each of a plurality of time points subsequent to the first time point, a plurality of frequency blocks from the range of frequencies, the frequency blocks allocated for that time point covering a subrange of frequencies greater than the subrange of frequencies covered by the frequency blocks allocated for the immediately previous time point.

14. The system of claim 13, wherein the subrange of frequencies increases by less than or equal to a predetermined amount at each of the plurality of time points subsequent to the first time point.

15. The system of claim 14, wherein the predetermined factor of the range is less than or equal to one-quarter of either a coherence bandwidth or the range at the immediately previous time point.

16. The system of claim 13, wherein an elapsed time between the first time point and the first one of the time points subsequent to the first time point is a function of channel statistics or channel conditions.

17. The system of claim 16, wherein the channel conditions or channel statistics are based on one or more parameters selected from the group consisting of mobile speed, symbol duration and carrier frequency.

18. The system of claim 16, wherein the channel conditions is represented by a correlation value that relates channel gains at two of the time points.

19. The system of claim 13, wherein an elapsed time between successive time points is a function of an estimate of an average speed of mobile users in the communication system.

20. The system of claim 13, wherein the telecommunication system comprises an OFDMA system.

21. The system of claim 20, wherein the time points are separated in time by an integral multiple of OFDM symbol durations.

22. The system of claim 13, wherein the telecommunication system comprises a base station and a plurality of mobile stations and wherein the telecommunication system is under centralized control by the base station.

23. The system of claim 13, wherein the telecommunication system comprises a base station and a plurality of mobile stations and wherein the telecommunication system is under distributed control by the mobile stations.

* * * * *